W. H. CAMERON.
SAFETY LOCK FOR RELATIVELY RECIPROCAL MEMBERS.
APPLICATION FILED JUNE 5, 1911.
1,031,836.
Patented July 9, 1912.
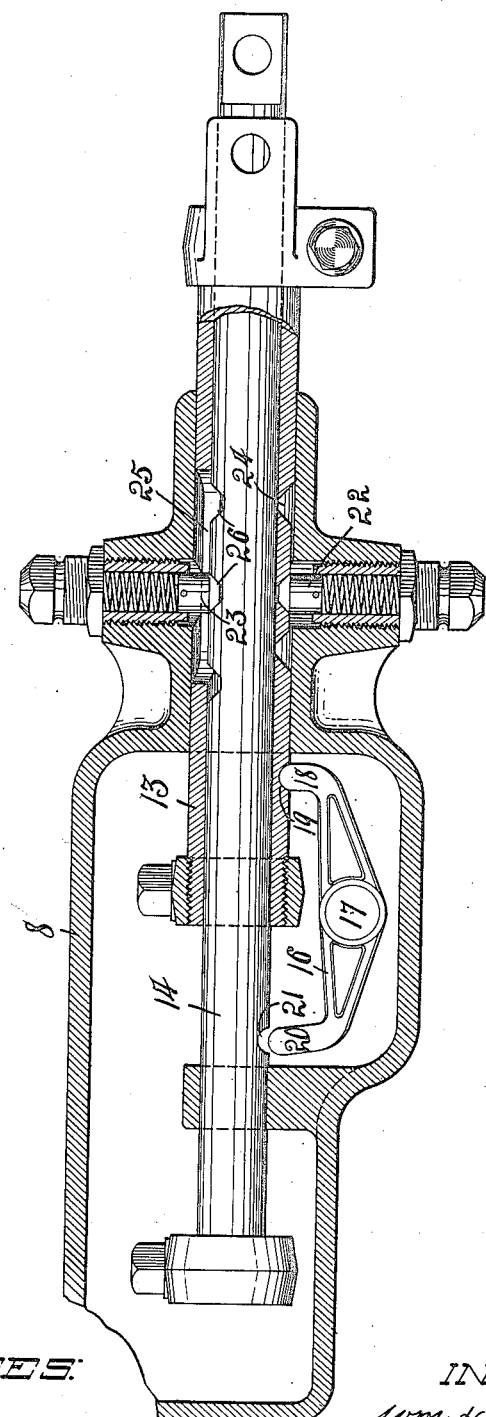

UNITED STATES PATENT OFFICE.

WILLIAM H. CAMERON, OF TOLEDO, OHIO, ASSIGNOR TO THE WILLYS-OVERLAND COMPANY, OF TOLEDO, OHIO, A CORPORATION OF OHIO.

SAFETY-LOCK FOR RELATIVELY RECIPROCAL MEMBERS.

1,031,836.     Specification of Letters Patent.    Patented July 9, 1912.

Application filed June 5, 1911. Serial No. 631,470.

*To all whom it may concern:*

Be it known that I, WILLIAM H. CAMERON, a citizen of the United States, and a resident of Toledo, in the county of Lucas and State of Ohio, have invented a certain new and useful Safety-Lock for Relatively Reciprocal Members; and I do hereby declare the following to be a full, clear, and exact description of the invention, such as will enable others skilled in the art to which it appertains to make and use the same, reference being had to the accompanying drawing, and to the figures of reference marked thereon, which form a part of this specification.

My invention relates to means for locking either of a pair of relatively reciprocal members against shifting movements when the other has been shifted from neutral position, and is particularly intended for use in connecting with the reciprocal gear shifting members of variable speed power transmission mechanisms, but is not restricted to such use as it may be used in any connection for which it is applicable.

The object of my invention is the provision of improved means of this character, which is automatically operable to positively lock either of two reciprocal members, working one within the other, in neutral position when the other is being shifted, and which prevents a shifting of both members in unison, thus preventing a stripping of the gear teeth or other injury which would be occasioned to an associated power transmission mechanism if both members were shifted in unison.

The invention is fully described in the following specification, and while, in its broader aspect, it is capable of embodiment in numerous forms, a preferred embodiment thereof is illustrated in the accompanying drawing which is a longitudinal section of a housing with my invention associated therewith and with parts broken away.

Referring to the drawing, 8 designates a housing which may form a portion of the housing of a power transmission mechanism and in which are suitably mounted the longitudinally shiftable rods or members 13 and 14 which are shown as being in nested or concentric relation, or working one within the other.

The shift-rod locking means of my invention is shown in the present instance as comprising an elongated rocker member or lever 16 which is disposed longitudinally of the shift rods 13 and 14 at one side thereof adjacent to their inner ends and is mounted intermediate its ends upon a stud 17 for rocking movements in the plane of said rods, as shown. One end of the rocker member 16 is angled, as at 18, toward the inner end portion of the rod 13 in position to seat within a registering notch 19 therein when the rod is in neutral position while the other end thereof is angled, as at 20, to enable it to seat within a registering notch 21 in the portion of the rod 14 which projects beyond the inner end of the rod 13 when the rod 14 is in neutral position, as hereinafter more fully described. The angled ends of the locking member are of suitable length to enable either but not both of them to seat within their respective notches 19, 21 at one time, the permissible rocking movement of the member 16 being substantially equal to the depth of said notches to enable either end of the member to stand retracted from the path of movement of its notch when the other end is seated in its notch.

It is apparent that when either rod 13, 14 is shifted from its neutral position the movement of the notch of such rod and co-acting lever end from engagement effects a rocking of the member 16 to move its opposite end into engagement with the notch of the other rod, if it be out of engagement therewith, and the released end then coacts with the side of the moving rod to positively retain the other end of the member in locking engagement with the notch of the stationary rod to prevent a movement thereof from neutral position until the moving rod has returned to its neutral position. To facilitate a disengaging of a notch and coacting member end when a rod is moved from neutral position the notches and member ends are rounded as shown, so that when relatively moved one will exert a cam action on the other.

Spring pressed detents 22 and 23 are carried by parts of the housing 8, and one coacts with notches 24 in the rod 13 and the other works through a slot 25 in the rod 13 and coacts with notches 26 in the rod 14 to yieldingly retain the respective rods in neutral or shifted positions, as is apparent. As the mechanism for selectively shifting the rods 13 and 14 forms no part of the present invention the same is not shown and described.

It is apparent that I have provided simple and efficient means which is automatically operated upon a shifting of either shift-rod 13, 14 from neutral position to positively lock the other rod in neutral position, thus insuring the desired selective shifting of parts associated therewith and preventing accident due to a shifting of more than one of such parts at a time.

I wish it understood that my invention is not limited to use in connection with any particular type of power transmission mechanism or to any specific construction or arrangement of the parts except in so far as such limitations are specified in the claims.

Having thus described my invention, what I claim as new and desire to secure by Letters Patent, is,—

1. In a power transmission mechanism, the combination with a pair of gear shifting members, one working within the other, of means which is automatically operative to lock either member in neutral position upon a shifting of the other member from neutral position.

2. In a power transmission mechanism, the combination with a pair of reciprocally movable gear shifting members, one working within the other, of a rocker member associated therewith and having its ends angled to adapt it to engage portions of said shiftable members, said rocker member being automatically operable by a movement of either shifting member from a predetermined position to lock either member in one position of its movement.

3. In a power transmission mechanism, the combination with a pair of concentric reciprocally movable gear shifting members, of a rocker member automatically operable by a movement of either shifting member from neutral position to lock the other shifting member in neutral position.

4. In a power transmission mechanism, the combination with a pair of concentric reciprocally movable gear shifting members each having a notch therein, of means automatically operable by a movement of either shifting member from neutral position to lock the other shifting member in neutral position.

5. In a power transmission mechanism, the combination with a pair of concentric reciprocally movable gear shifting members each having a notch therein, of a rocker member pivoted adjacent said shifting members and having its ends angled in position to work into respective ones of said notches when the shifting members are in neutral position, said rocker member being automatically operable by a shifting movement of either shifting member to coöperate with the notch in the other shifting member to lock it in neutral position.

In testimony whereof, I have hereunto signed my name to this specification in the presence of two subscribing witnesses.

WILLIAM H. CAMERON.

Witnesses:
C. W. OWEN,
E. E. THOMAS.